US005108349A

United States Patent [19]

Yamamoto

[11] Patent Number: 5,108,349

[45] Date of Patent: Apr. 28, 1992

[54] BELT DRIVING MECHANISM FOR GAME MACHINES

[75] Inventor: Hiroshi Yamamoto, Tokyo, Japan

[73] Assignees: Leisure Create Co., Ltd., Tokyo; Newgin Co., Ltd., Nagoya, both of Japan

[21] Appl. No.: 641,748

[22] Filed: Jan. 14, 1991

[51] Int. Cl.[5] ...................... F16H 7/00

[52] U.S. Cl. ...................... 474/149; 474/186; 273/143 B

[58] Field of Search .......... 273/143 B, 138 A, 85 CP; 474/148, 149, 159, 153, 184–188, 204, 205

[56] References Cited

U.S. PATENT DOCUMENTS

| | | | |
|---|---|---|---|
| 3,464,743 | 9/1969 | Hallaman | 474/204 X |
| 4,573,953 | 3/1986 | Tangorra | 474/204 X |
| 4,838,552 | 6/1989 | Hagiwara | 273/138 A |

FOREIGN PATENT DOCUMENTS

| | | | |
|---|---|---|---|
| 214052 | 12/1983 | Japan | 474/153 |
| 1184996 | 10/1985 | U.S.S.R. | 474/153 |

*Primary Examiner*—Ramon S. Britts
*Assistant Examiner*—Roger J. Schoeppel
*Attorney, Agent, or Firm*—Spencer, Frank & Schneider

[57] ABSTRACT

The present invention comprises an endless belt which is provided with perforations at the edge on the opposite sides at a regular interval, a pair of belt pulleys around which said endless belt is suspended, a sprocket wheel which is disposed substantially at midway between the pair of pulleys and whose teeth engage with the perforations on the endless belt, a stepping motor which drives the toothed wheel, and a drive circuit which drives said stepping motor. Said sprocket wheel has a diameter larger than that of the pulleys, so that the endless belt would tightly press against the sprocket and held in place.

2 Claims, 2 Drawing Sheets

BELT DRIVING MECHANISM FOR GAME MACHINES

BACKGROUND OF THE INVENTION

The present invention relates to a mechanism for driving a belt which constitutes one of the display units of a game machine such as slot machines. Generally, display units of a game machine comprising more than one endless belts carrying several kinds of graphic patterns and signs on the surface are rotated, and when the rotation is stopped, the patterns on the adjacent belts may coincide with one another in the lateral or diagonal relations.

PRIOR ART

According to conventional game machines, particularly slot machines, plural cylindrical rotary members carrying graphic patterns and signs thereon are rotated to have the patterns matched in the lateral or diagonal relations when the rotary members are suspended.

One of the defects of such cylindrical rotary members lies in that to facilitate viewing of the patterns on the cylindrical member by the players, the surface of the rotary members must be made as flat as possible, which in turn means that the diameter of each rotary member inevitably becomes larger. This in turn makes the entire machine voluminous, and compact (thinner) machines have long been awaited.

There have been proposed various types of game machines comprising endless belts: e.g. a slot machine wherein a flexible belt with graphic patterns is suspended between a pair of rotary members (Jap. Utility Model Application Laid-open No.Sho 58-33088); a slot machine wherein a plurality of display members carrying several kinds of graphic patterns thereon in the longitudinal direction at regular intervals are mounted in a row on a shaft and are rotated by a motor which in turn is controlled by a control unit (JPA Laid-open No.Sho 57-122879).

Such prior art mechanism for driving endless belts are defective in that since the endless belt is merely suspended over rollers or the like, the belt may sometimes slip idly on the rollers depending on friction between the rollers and the belt. This may result in patterns not stopping at the predetermined positions, and make it difficult to electrically judge whether or not the patterns are matched.

Furthermore, the endless belts would sometimes slip sideways and become deviated beyond the display unit.

OBJECTS

In view of the defects in the prior art, the present invention aims at providing a mechanism for driving endless belts in a game machine which enables smooth running of the belts without sideward slippings and which enables accurate positioning (in respect of the position on the display unit) of the patterns on the belts when the belts stop rotating.

Another object of the present invention is to provide compact game machines by the use of belts.

SUMMARY OF THE INVENTION

To achieve the above mentioned objects, the mechanism for driving the belts in a game machine according to the present invention comprises a plurality of pattern display units arranged in a row and each comprising an endless belt which is provided with perforations at the edges on both sides at regular intervals a pair of belt pulleys around which said endless belt is suspended, a sprocket wheel which is disposed at a midpoint between said pair of pulleys and which engages with the perforations of the endless belt and a stepping motor which drives said sprocket wheel, and a drive means for driving each of the stepping motors in the display units and is characterized in that said sprocket wheel arranged between the belt pulleys has a diameter larger than that of the pulleys.

To prevent sideward slipping of the belt, it is preferable that a flange each is provided in the radial direction along the periphery on both sides of belt pulleys.

The diameter of the belt pulleys is made smaller than the diameter of the sprocket wheel in order to facilitate smooth transmission of the rotations of the belt.

The mechanism according to the present invention is so structured that the sprocket wheel disposed between a pair of belt pulleys functions to independently drive each of the endless belts.

As the sprocket wheel with a diameter larger than the diameter of the belt pulleys is held tightly in place by the endless belt, the toothed portion of the sprocket wheel will not become disengaged from the perforations of the endless belt even if the belt may become expanded due to frictional heat or the like.

Accurate movement of the endless belt is assured at all times as the sprocket wheel which drives the endless belt is rotated by the stepping motor.

Further, the sprocket wheel which firmly engages with the endless belt via the perforations provided on both sides of the belt is capable of rotating the belt while correcting the sideward slipping of the belt.

BRIEF DESCRIPTION OF THE DRAWINGS

FIG. 1 is a partially exploded front view to show the rotary unit of the mechanism;

FIG. 2 a sectional view along the line II—II in FIG. 1; and

FIG. 3 a block diagram to show the entire construction of the mechanism.

DETAILED DESCRIPTION OF THE PREFERRED EMBODIMENT

Figure 1:
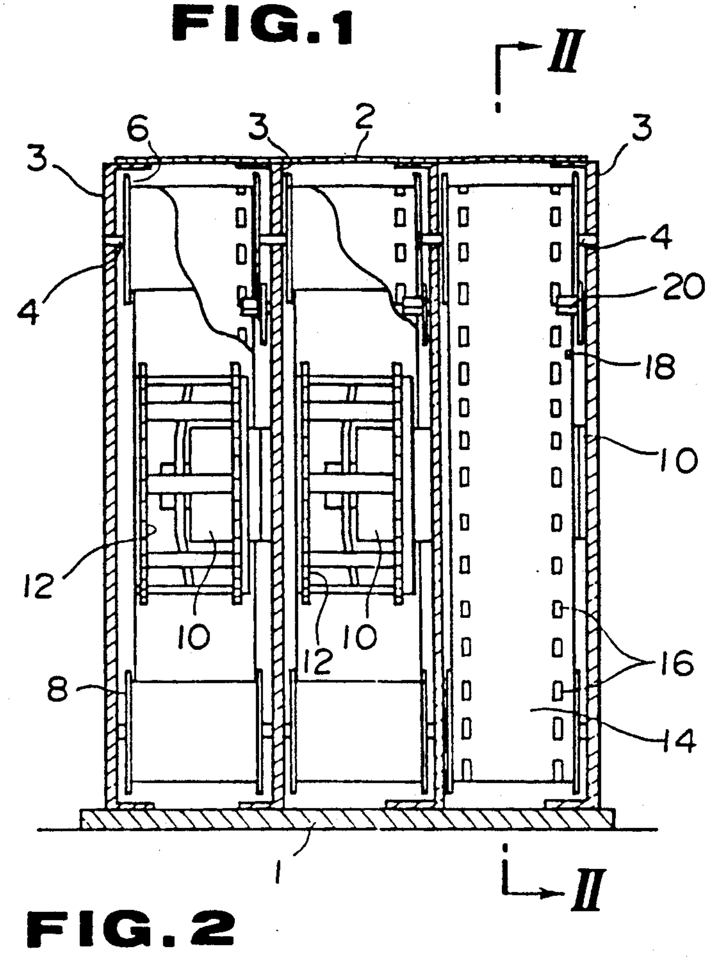
FIGS. 1 through 3 show one embodiment according to the present invention.
Figure 2:
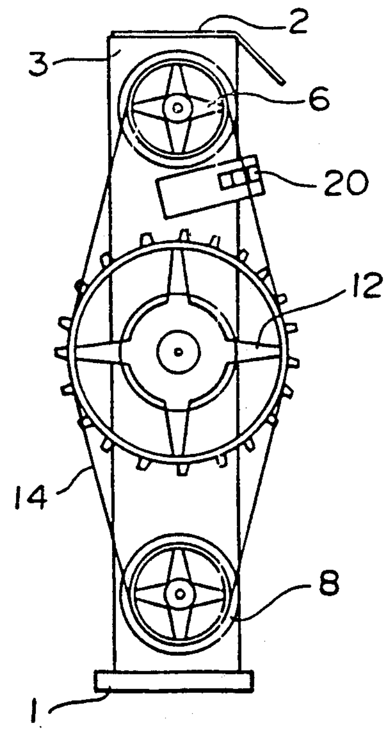

The present invention will now be described in detail referring to the accompanying drawings.

In the drawings, the reference number 1 denotes a base, and the space between the base 1 and an upper plate 2 is sectioned into three blocks by partitions 3.

Belt pulleys 6 and 8 are journaled on shafts 4 suspended between the partitions 3 at the top and the bottom of each block respectively. The belt pulleys 6, 8 comprise a cylindrical member each provided with flanges extending outward from the periphery of opposite sides.

A stepping motor 10 each is provided at the center of each partition 3, and a sprocket wheel substantially cylindrical and larger in diameter than the belt pulley 6 or 8 is provided on the rotary shaft of the stepping motor 10.

Each sprocket wheel 12 is toothed in parallel circumferentially on both sides at regular intervals.

Endless belts 14 on which several kinds of graphic patterns and signs are depicted are suspended over the belt pulleys 6, 8 and the wheel 12. Perforations 16 are provided at the edge of each endless belt on both sides at the intervals corresponding to the gap between each tooth of the sprocket wheel 12 so that each tooth engages with the perforation 16.

A notch 18 for indicating the position of the belt is provided on one side of the endless belt 14 at a position slightly beyond the perforations 16 toward the edge, so that a position detecting means 20 disposed on the track of each endless belt detects the notch 18 as the belt passes.

The position detecting means 20 comprises a photoelectric tube and a photoelectric element, and is so structured that electric current flows when the notch 18 of the endless belt 14 passes through the position detecting means 20.

Figure 3:
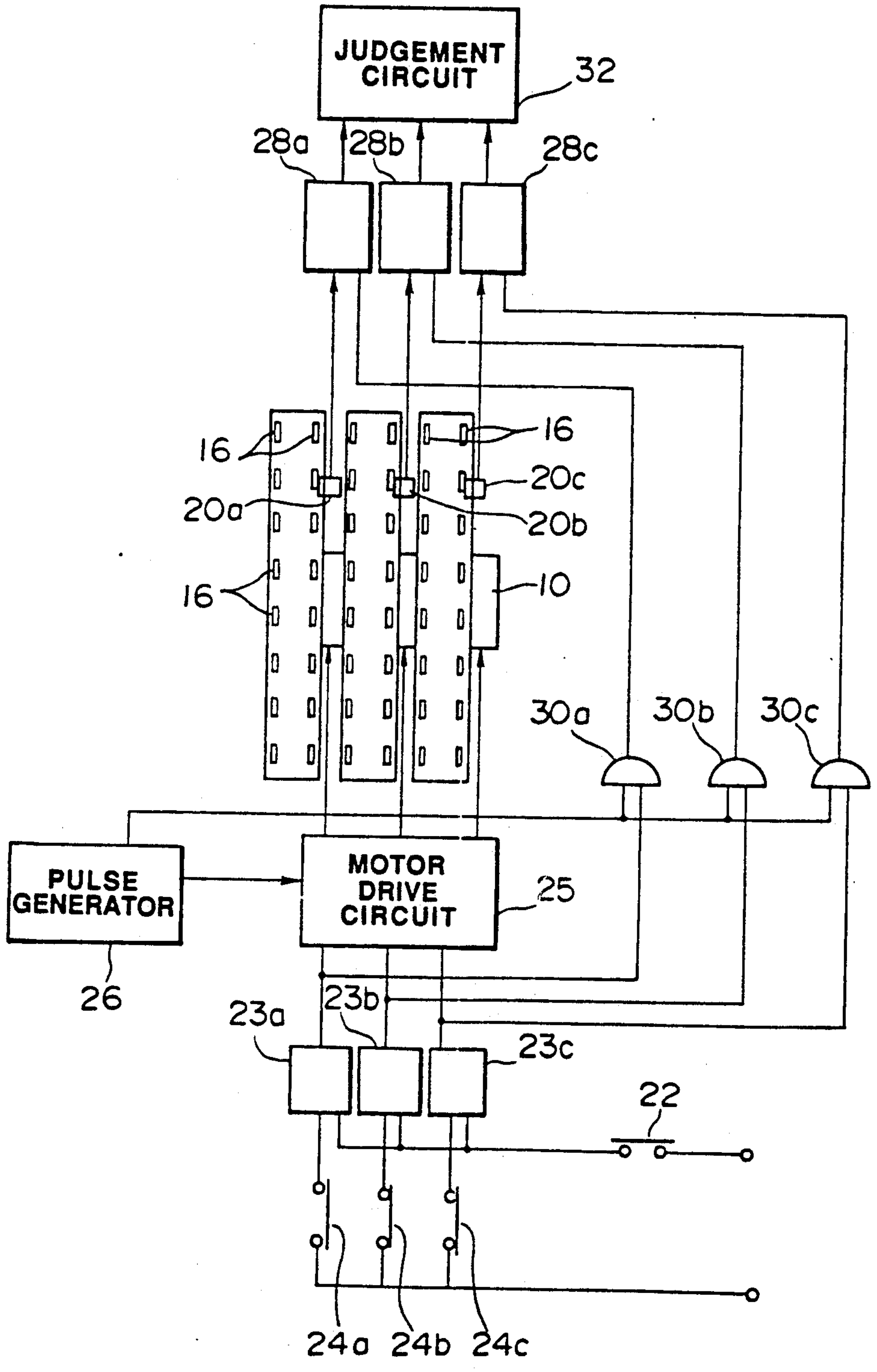

Each stepping motor 10 is driven by the driving means shown in FIG. 3, and matching of the patterns when the endless belt 14 stops rotating is judged by a judgement circuit 32 as shown in FIG. 3.

The reference number 22 denotes a switch, and switches 24*a*, 24*b* and 24*c* for operating random number generators 23*a*, 23*b* and 23*c* are connected in parallel with the switch 22.

The output from each of the random number generator 23*a*, 23*b* or 23*c* is connected to a motor drive circuit 25, which drives each of the stepping motors 10 in accordance with the drive pulse from a pulse generator 26.

The reference numbers 28*a*, 28*b* and 28*c* denote pulse counters which count the number of pulses outputted from the motor drive circuit 25 to each of the stepping motors 10 from the moment when the motor drive circuit 25 is initiated to zero by the clearing signals from the position detection means 20*a*, 20*b* and 20*c*.

Logical products of the input voltages from the pulse generator 26 and the random number generators 23*a*, 23*b* and 23*c* obtained by the AND gates 30*a*, 30*b* and 30*c* are inputted at the pulse counters 28*a*, 28*b* and 28*c* in the form of pulses.

Results obtained at the pulse counters 28*a*, 28*b* and 28*c* are outputted to the judgement circuit 32, which in turn judges whether or not the patterns in lateral or diagonal relation are matched based on the inputs indicating the relations between the number of pulses and the patterns or signs inputted in advance at the judgement circuit 32.

Each of the random number generators 23*a*, 23*b* and 23*c* is constructed to generate random numbers when, for example, the switches 24*a*, 24*b* and 24*c* are shifted from ON to OFF, and to supply power for a duration of time which corresponds to the generated random number.

With the mechanism having the above construction, the switch 22 is initially turned ON, and the motor drive circuit 25 is constantly supplied with power as the switches 24*a*, 24*b* and 24*c* are turned ON and the drive circuit 25 supplies pulse current to the stepping motor 10. Thereupon, the endless belts 14 start rotating with the sprocket wheels 12, and patterns displayed on the unit start changing (not shown).

As the player turns each of the switches 24*a*, 24*b* and 24*c* OFF, the random number generators 23*a*, 23*b* and 23*c* generate random numbers respectively, and current is supplied to the motor drive circuit for a duration of time which corresponds to each of the random numbers. As a result, the stepping motor 10 continues to rotate even after the switches 24*a*, 24*b* and 24*c* are turned OFF before coming to a halt after a predetermined period of time elapses.

In the meantime, the stepping motor 10 rotates for the number of steps proportional to the number of pulses generated by the pulse generator 26. The number of pulses of the motor is counted by the pulse counter 28 to learn the rotation of the endless belts 14.

As the notch 18 is provided on one edge of each endless belt 14 for indicating the position of the belt, the pulse counter 28 is reset as zero to resume counting when the notch 18 is detected by the position detecting means 20. Thus increasing within one rotation of the belt (360 degrees), when the endless belt 14 turns around once, the count by the counter becomes zero. Based on the rotational angles as relative to the pattern data that are inputted in advance, matching of the patterns is judged.

As the sprocket wheel 12 engages with the perforations 16 provided on the edge of the opposite sides of the endless belt 14 via the teeth when the sprocket wheel is rotated by the stepping motor 10, the endless belt is caused to rotate, without slipping, as efficiently as when a rotary member is used.

Further, as the sprocket wheel which is larger in diameter than the belt pulleys is fitted inside the endless belts at the center thereof, there is no risk of the belt coming off even if its rate of rotation is increased.

Although the present invention has been explained with respect to an embodiment which is a slot machine, it should be noted that the present invention is in no way limited by the embodiment. The present invention can be applied to card game machines as well if five rows of pattern display units are arranged.

The mechanism for driving a belt of a game machine according to the present invention is so constructed that it enables the belt to move more accurately without slipping sideways when compared with the conventional endless belt type, and the belt can be positioned as precisely as in the case of a mechanism using rotary members alone.

As accurate positional detection is possible even with endless belts, compact machines can be realized which was not possible heretofore with the conventional rotary member.

Further, the present invention is advantageous in that as the graphic patterns and signs can be displayed by means of the endless belts substantially in parallel with the surface at the display unit, it is easier for the players to identify the patterns.

What is claimed is:

1. A mechanism for driving a belt in a game machine which comprises more than one display units arranged in a row and each comprising an endless belt which is provided with perforations at the edge of opposite sides at regular intervals, a pair of belt pulleys around which said belt is suspended, a sprocket wheel which is disposed substantially midway between the pulleys and which engages with said perforations on the endless belt, and a stepping motor which drives said sprocket wheel, and a drive means which drives each of said stepping motor of the display unit, the mechanism being characterized in that the sprocket wheel disposed between the belt pulleys has a diameter larger than that of the pulleys.

2. The mechanism as claimed in claim 1 wherein said belt pulleys are provided with radially extending flange at the periphery on both sides.

* * * * *